Figure 1:
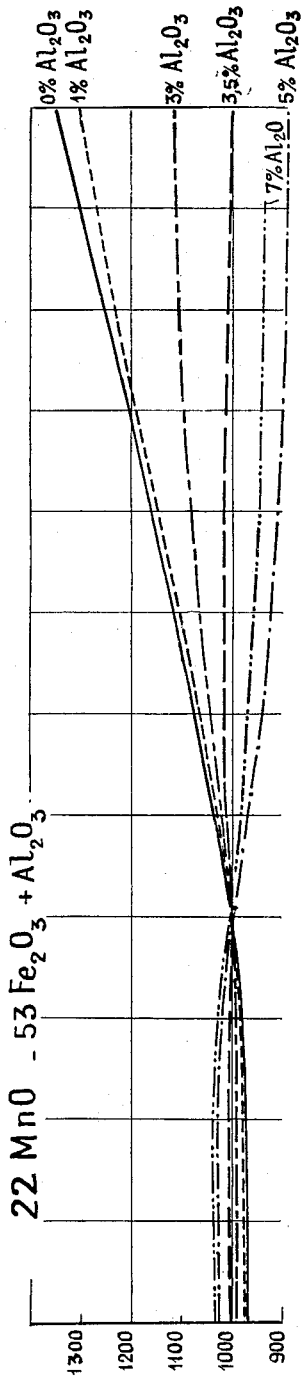

March 28, 1961 C. L. GUILLAUD ET AL 2,977,311
FERROMAGNETIC CERAMIC MATERIALS
Filed Jan. 31, 1956 4 Sheets-Sheet 1

Inventors
C. L. GUILLAUD-
A. PIERROT-
Y. C. LESCROEL
By R. P. Morris
Attorney

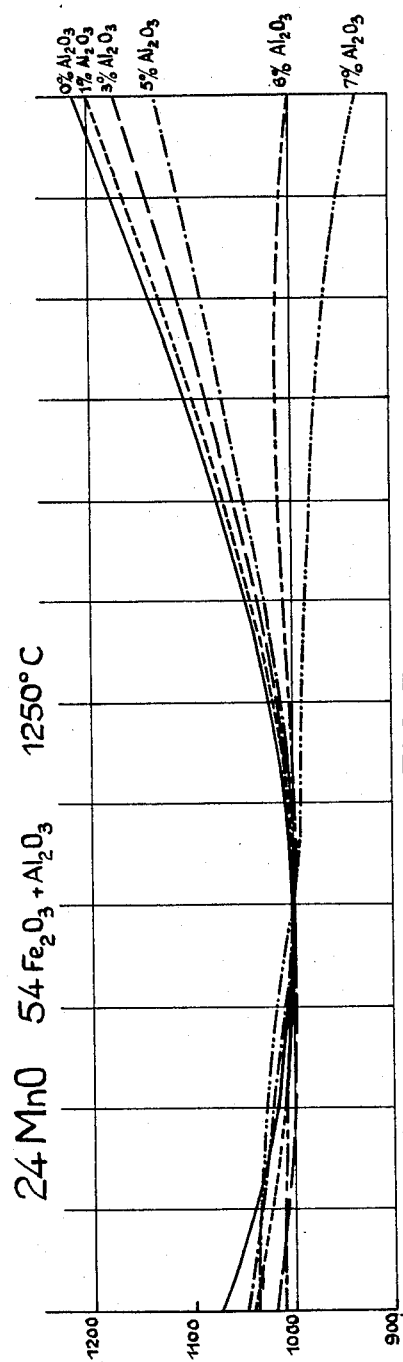
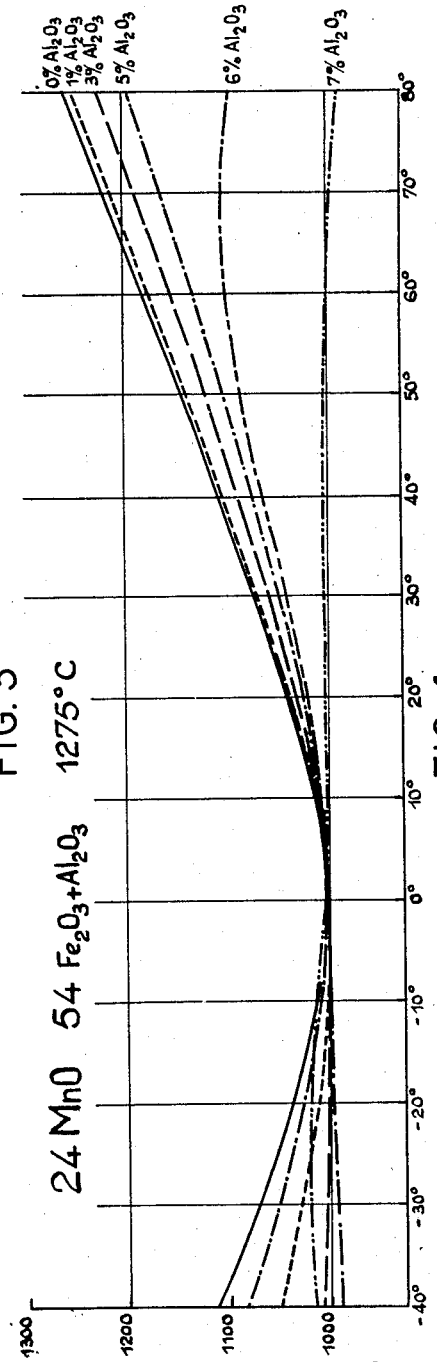

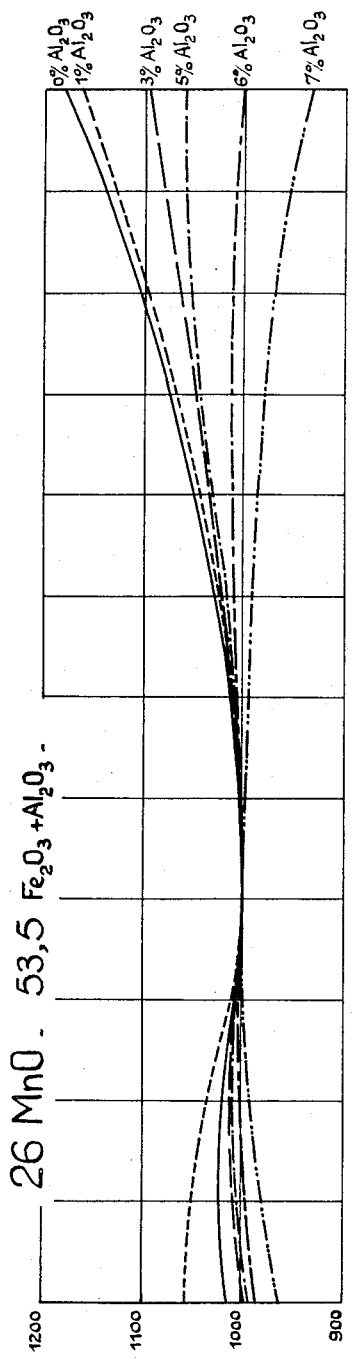
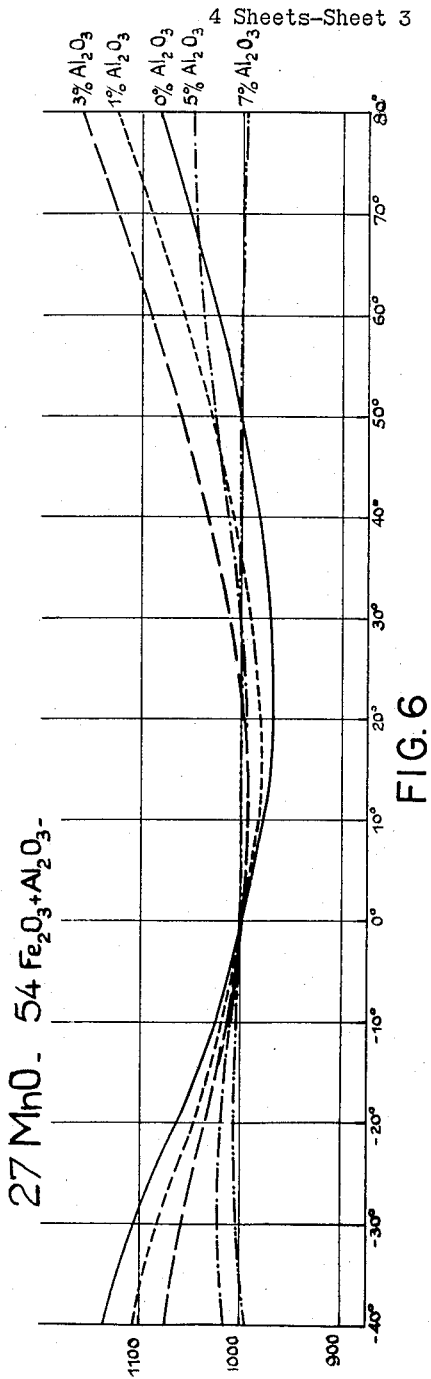

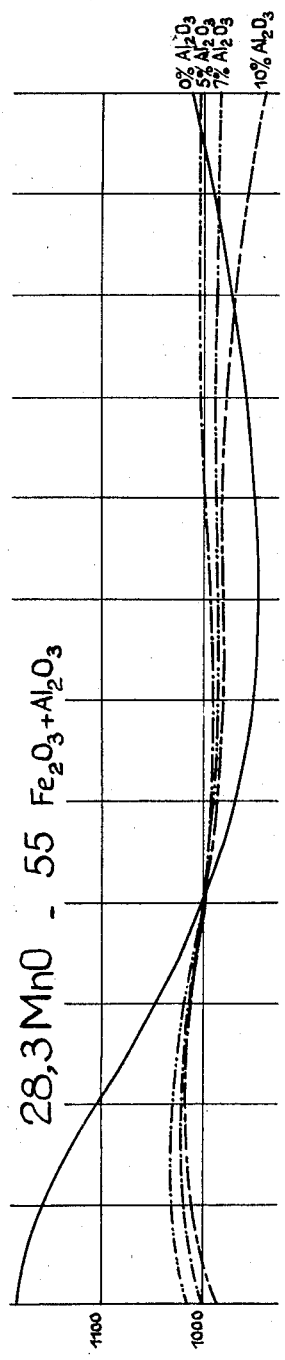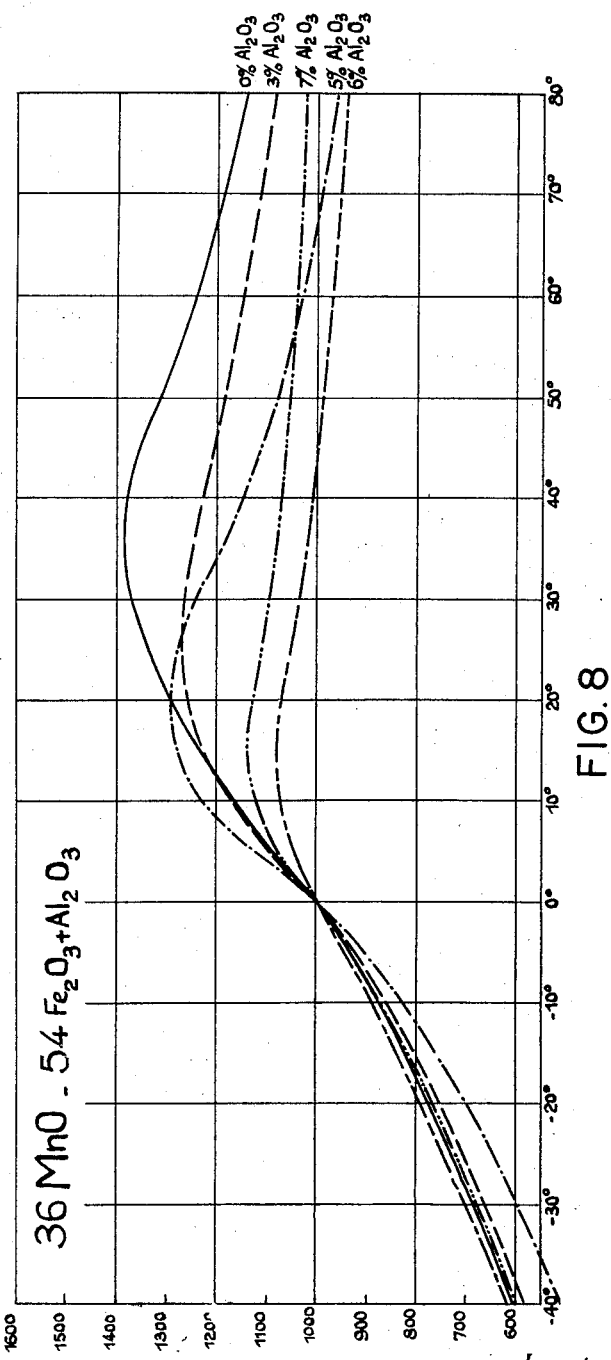

2,977,311

FERROMAGNETIC CERAMIC MATERIALS

Charles Louis Guillaud, Bellevue, and André Pierrot and Yves Charles Lescroel, Conflans-Sainte-Honorine, France, assignors to Centre National de la Recherche Scientifique, Paris, France, a French government administration Filed Jan. 31, 1956, Ser. No. 562,543

Claims priority, application France Feb. 3, 1955

4 Claims. (Cl. 252—62.5)

This invention relates to ferromagnetic ceramic materials made by pressing and sintering a mixture of metal oxides, and more particularly to such materials having high permeability and low losses and suitable for use as filter coils, transformer cores and the like for high frequency applications.

It is generally recognised that the best materials of this kind are prepared from mixtures containing an oxide of manganese, zinc oxide and ferric oxide.

The permeability of these materials varies with temperature to a greater or less extent. The extent of variation is conveniently expressed as the temperature coefficient of initial permeability over a given temperature range.

One of the present applicants has described in the U.S. Patent No. 2,886,529, granted May 12, 1959, a method of manufacturing ferromagnetic ceramic materials from a mixture of ferric oxide, an oxide of manganese and zinc oxide. The best materials resulting from this method were made from a mixture consisting substantially wholly of these oxides and these last mentioned materials possessed very much higher permeabilities and lower losses than had previously been achieved.

The object of the present invention is to reduce the temperature coefficient of initial permeability of a material prepared from a mixture composed substantially wholly of ferric oxide, an oxide of manganese and zinc oxide.

According to the present invention the temperature coefficient of initial permeability of such a material is reduced by at least one half by replacement of part of the ferric oxide by aluminium oxide.

In this specification the temperature coefficient of initial permeability over a range of temperature is the difference between the maximum and minimum permeabilities occurring in that range divided by the product of the initial permeability at 0° C. and the difference between the maximum and minimum temperatures of the range and will be expressed in percentage per degree centigrade.

It has previously been stated that part of the ferric oxide in a copper zinc ferrite may be replaced by aluminium oxide whilst retaining the ferrite crystal structure of the sintered magnetic product. It is known, also, however, that the substitution of trivalent aluminium ions for ferric ions in certain ferrites leads to a lowering of the magnetic moment at saturation.

It has also been proposed, in ferrites for use in a so-called "gyrator" and having low permeability to replace part of the iron by aluminium.

It is the discovery of the applicants that the replacement of ferric oxide by aluminium oxide in manganese zinc ferrites can lead to a decrease in the temperature coefficient of permeability, and this more particularly over a wide temperature range.

By means of the present invention very small temperature coefficients of initial permeability may be obtained over a temperature range from 0° C. to 80° C. for materials derived from manganese zinc ferrites and for most of such materials over the temperature range from −40° C. to +80° C.

It is to be noted that the materials resulting from the introduction of aluminium oxide into the crystal structure are no longer strictly speaking ferrites but are mixed ferrites and aluminites.

By carrying out the present invention with a method of preparation as described in the above mentioned prior specification of the applicants the desired reduction of temperature coefficient of initial permeability is obtained without reducing the initial permeabilty below 600 and without undue losses.

In order to judge the quality of the different materials the product ($\mu Q$) of the initial permeability $\mu$ and the quality factor Q of the material is frequently used and will be referred to hereinafter as the coefficient of quality of the material. The quality factor Q is the ratio of the reactance of a coil wound on a core without airgap to the resistance of the winding due to the losses in the material. The quality factor is determined in a very low field (10 millioersteds) at 20° C. and at a frequency of 100 kc./s. By undue losses is meant a coefficient of quality that is less than 50,000. The present invention can thus be carried out without reducing the coefficient of quality below 50,000.

As the properties of a ferromagnetic ceramic material depend upon the final composition it is preferable to express the method according to the invention and the materials obtained by the method in terms of the change in the final composition that is effected.

According to one aspect of the present invention, therefore, a method of reducing the coefficient of ferromagnetic ceramic material composed of substantially 50 mol percent of ferric oxide and the remainder substantially wholly manganous oxide, zinc oxide and ferrous oxide consists in replacing between 2.5 mol percent and 11 mol percent of the said ferric oxide by aluminium oxide, the amount of ferric oxide so replaced depending upon the manganese content and being such as to reduce the temperature coefficient of initial permeability by at least one half of that of the material without aluminium oxide, over a temperature range of −40° C. to +80° C. for materials containing up to 30 mol percent of manganous oxide and over the temperature range 0° C. to +80° C. for materials containing 30 mol percent and upwards of manganous oxide.

By the material being composed substantially wholly of the oxides stated is meant that there is no more than 1.5% by weight of any other constituent.

The effects of the replacement of ferric oxide by aluminium oxide are (a) a decrease in the permeability, this decrease being greater the greater the proportion of aluminium oxide present, (b) an increase in the losses, which increase can be kept small by incorporating in the material a small quantity of calcium oxide which is added to the initial mixture preferably in the form of calcium carbonate to the extent of .01% to 1% by weight and preferably in 0.2% by weight, (c) a lowering of the Curie point in almost linear proportion to the amount of aluminium oxide (5 mol percent of aluminium oxide lowers the Curie point by about 20° C.), (d) a decrease in the temperature coefficient of permeability over a wide range of temperature.

The effect of the replacement of a given molecular proportion of ferric oxide by an equal molecular proportion of aluminium oxide on the temperature coefficient of initial permeability depends upon the manganese content as will be seen from the particulars given hereinafter.

Unless stated to the contrary all the examples given hereinafter have been prepared by mixing together the oxides in the molecular proportions given (with the addition of 0.2% by weight of calcium carbonate) by grinding in a mill with steel balls with distilled water for 24 to 48 hours, drying and pressing into toroidal cores at a pressure of 5 metric tons per square centimetre.

The initial materials are preferably as pure as possible and impurities containing positive ions having a radius exceeding 1.2 angstrom units should be avoided, such as potassium, strontium, barium, etc. (The values of the ionic radius to be taken into account are those given in the publication by Goldschmidt: "Geschemische Verteilungagesets der Elemente," Skrifer det Norske Videnskaps Akad. Oslo. I. Maten, Naturvid klasse 1926.) The maximum content of these impurities having an ionic radius greater than 1.2 angstrom units should preferably not exceed 0.2% by weight. The pressed cores are then heated at 1250° C. for a period of 2 to 4 hours with circulation of an atmosphere of nitrogen containing 1% of oxygen and then cooled in pure nitrogen down to room temperature in a period of 8 hours.

The invention will be better understood from the following description taken in conjunction with the accompanying drawings comprising Figs. 1 to 8 in which each figure gives a set of curves showing the variation of initial permeability—with temperature of compositions with varying content of aluminium oxide $Al_2O_3$. The compositions given are the compositions before heat treatment. The initial permeability has in each case been reduced to 1000 at 0° C. and the initial permeabilities at other temperatures have been multiplied by the same factor to facilitate comparison.

Referring now to the drawings and first to the curves in Fig. 1, which show the variation with aluminium oxide content of initial permeability in the temperature range —40° to +80° C. of ferromagnetic ceramic materials prepared from mixtures containing 22 mol percent MnO, 53 mol percent of the sum of ferric oxide and aluminium oxide the remainder being zinc oxide. After heat treatment at 1250° C. in nitrogen containing 1% of oxygen the composition is altered by conversion of some of the ferric oxide into ferrous oxide as described in the specification above referred to. The amount of ferrous oxide formed from a given initial content of ferric oxide by the heat treatment referred to above is found to be substantially unaltered by the presence of aluminium oxide.

The magnetic properties of the material having zero aluminium oxide content are as follows:

Initial permeability at 20° C.=3100; temperature coefficient of initial permeability 0.32% per degree centigrade, for the temperature range —40° C. to +80° C.

It will be noted from the curves given that the replacement of even as little as 1 mol percent of ferric oxide by a like amount of aluminium oxide has reduced the temperature coefficient of permeability over the range above mentioned. With 3 mol percent of aluminium oxide and still better with 3.5 mol percent, the improvement in temperature coefficient of permeability is striking. In order to reduce the temperature coefficient to one half of the value without aluminium oxide the content of the latter should be at least 2.5 mol percent.

For the material containing 3.5 mol percent of aluminium oxide the following properties are obtained:

Initial permeability=2150
Curie point=105° C.
Coefficient of quality=200,000
Temperature coefficient of permeability over the range —40° C. to +80° C.=0.01% per degree centigrade.

The final composition after heat treatment of this last mentioned material is the following: 50.6 mol percent for the sum of ferric oxide and aluminium oxide, 3.2 mol percent of ferrous oxide (2.1% by weight), 21.6 mol percent of MnO and the remainder zinc oxide with a very small amount of calcium oxide. Other materials to which the other curves in Fig. 1 relate have practically equivalent contents of ferrous oxide.

With quantities of aluminium oxide exceeding 3.5 mol percent the permeability changes with temperature in the opposite direction to that of the type material, decreasing with temperature in the interval 0° C. to +80° C. Up to and including 5 mol percent the value of the temperature coefficient remains at ½ or less of the value without the presence of aluminium oxide. For contents of aluminium oxide above 5 mol percent the Curie point becomes less than 100° C., and the material is thus not practicable for use in a temperature range that extends to +80° C.

Figure 2:
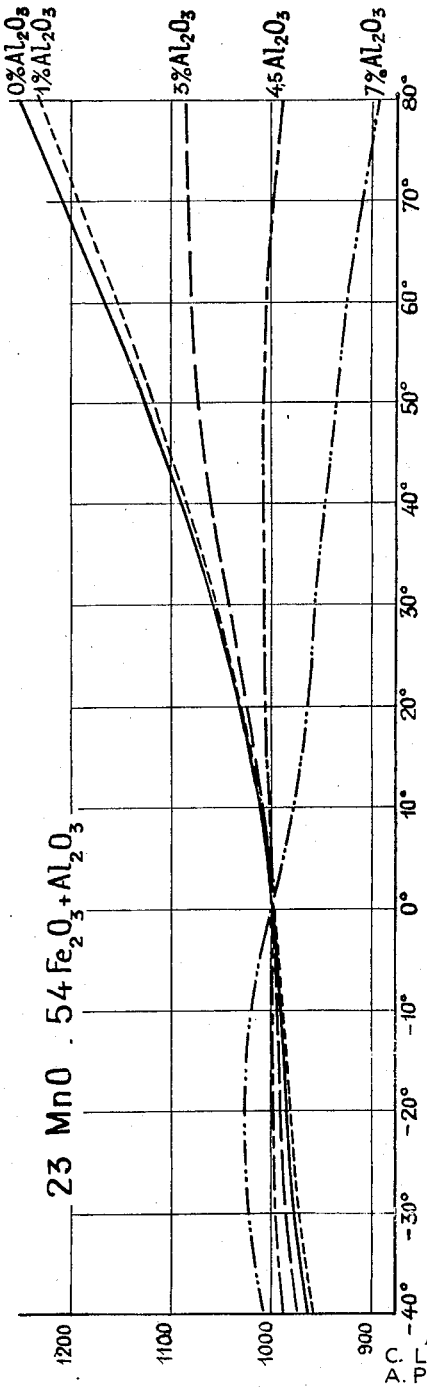

Fig. 2 gives curves on a similar basis to that of Fig. 1 for mixtures which before pressing contain 23 mol percent MnO, 54 mol percent of ferric oxide plus aluminium oxide, remainder zinc oxide.

The materials to which this figure relates have the final molecular composition 50.5 mol percent of the sum of ferric oxide and aluminium oxide, 4.5 mol percent ferrous oxide (2.8% by weight), 22.5 mol percent manganous oxide and the remainder zinc oxide.

The material not containing aluminium oxide has an initial permeability of 2,500 and a temperature coefficient of initial permeability of 0.24% per degree C. for the range —40° C. to +80° C.

It will be noted that, as before, the inclusion of as little as 1 mol percent aluminium oxide leads to a decrease in the temperature coefficient of permeability. Still greater decreases are produced by the inclusion of 3 mol percent and greater decreases still by 4.5 mol percent aluminium oxide. For the last mentioned composition the temperature coefficient of permeability is 0.02% per degree centigrade for the range —40° C. to +80° C., its initial permeability is 1700 and the coefficient of quality =210,000.

An aluminium oxide content of 2.6 mol percent is sufficient to decrease the temperature coefficient of permeability to one half of the value without aluminium oxide.

For amounts of aluminium oxide greater than 4.5 mol percent the permeability changes, in the opposite direction to that of the type material, but the values of the temperature coefficient remain less than or equal to one half of the value without aluminium oxide up to a content of 7 mol percent of aluminium oxide.

Fig. 3 gives similar curves for mixtures initially containing 24 mol percent MnO, 54 mol percent of the sum of ferric oxide and aluminium oxide, remainder zinc oxide.

The material containing no aluminium oxide has a temperature coefficient of permeability over the range shown of 0.18% per degree centigrade.

The curves show the influence of 1, 3, 5, 6 and 7 mol percent ferric oxide content replaced by equivalent contents of aluminium oxide. With this MnO content an aluminium oxide content of 5.2 mol percent is required to reduce the temperature coefficient to one half of its value without aluminium oxide.

For an aluminium oxide content of 6 mol percent the temperature coefficient over the range shown is 0.02% per degree C., the permeability is 1250 and the coefficient of quality is 190,000.

The temperature coefficient of permeability is decreased to one half the value or less of that of the material without aluminium oxide for aluminium oxide contents from 5.2 mol percent to 7 mol percent without the permeability falling below 800 or the coefficient of quality below 80,000.

Fig. 4 shows curves for the same starting composition but heat treated at 1275° C. instead of at 1250° C. to show the effect of different heat treatments.

The magnetic properties of the material without aluminium oxide are initial permeability 2,300 temperature coefficient of permeability over the range —60° C. to +80° C.=0.21% per ° C.

In this case a content of aluminium oxide of 5.9 mol percent is required to reduce the temperature coefficient to one half of its value without aluminium oxide. The important difference produced by heat treatment at a higher temperature will be noted. In particular it is necessary to increase the aluminium oxide content to 7 mol percent to reach the minimum temperature coefficient of permeability.

For this aluminium oxide content the final composition is 43.6 mol percent ferric oxide, 6.8 mol percent aluminium oxide, 4.8 mol percent ferrous oxide, 23.4 mol percent MnO and the remainder zinc oxide (the content by weight of FeO being 3%).

This material has an initial permeability of 1100 coefficient of quality 165,000, a temperature coefficient of 0.02% per degree C. over the range −40° C. to +80° C., and a Curie point of 127° C.

It will be seen that larger amounts of aluminium oxide can be included with advantage in the case of heat treatment at the temperature of 1275° C. than for heat treatment at 1250° C.

The temperature coefficient remains at less than one half of its initial value whilst keeping the permeability at least 600 and the coefficient of quality at least 50,000 for contents of aluminium oxide up to 11 mol percent.

Fig. 5 gives curves showing the influence of aluminium oxide content on the temperature coefficient of permeability for compositions containing initially 26 mol percent MnO, 53.5 mol percent of the sum of ferric oxide and aluminium oxide, remainder zinc oxide. The final composition after heat treatment contains 50.6 mol percent of the sum of ferric oxide and aluminium oxide and 3.8 mol percent of ferrous oxide (2.4% by weight), 25.5 mol percent MnO, remainder zinc oxide.

The composition with zero content of aluminium oxide has an initial permeability of 2,750 and a temperature coefficient of permeability 0.16 per degree C. over the range −40° C. or +80° C. Curie point 160° C. The addition of 1 mol percent of aluminium oxide has the effect of slightly decreasing the temperature coefficient for the range 0° C. to +80° C. but increases it for the temperature range −40° C. to 0° C. and thus gives little or no improvement for the full temperature range of −40° C. to +80° C. For increased amounts of aluminium oxide an overall improvement is effected. A composition containing initially 6 mol percent of aluminium oxide has an initial permeability of 1250, a coefficent of quality=185,000, a temperature coefficient of initial permeability 0.02% per degree for the range −40° C. to +80° C., and a Curie point of 136° C.

A content of 4 mol percent aluminium oxide reduces the temperature coefficient to one half of its value without aluminium oxide, and this temperature coefficient remains at half the original value up to an aluminium oxide content of 7 mol percent whilst still keeping the initial permeability not less than 600, and the quality factor of the core material not less than 50,000.

Fig. 6 shows similar curves for a composition containing initially 54 mol percent of the sum of ferric oxide and aluminium oxide, 27 mol percent of MnO, and the remainder ZnO. The composition without aluminium oxide has a temperature coefficient of initial permeability of 0.15% per degree C. and an aluminium oxide content of 7 mol percent gives the minimum value of less than 0.01% per degree C. This material has an initial permeability of 1050, a coefficient of quality of 170,000 and a Curie point of 170° C. The temperature coefficient remains below one half of the value without aluminium oxide for contents of the latter between 3 and 11 mol percent.

Fig. 7 shows similar curves for an initial composition containing 28.3 mol percent MnO, 55 mol percent of the sum of ferric oxide and aluminium oxide.

The composition after heat treatment is substantially as follows: 50.7 mol percent of the sum of ferric oxide and aluminium oxide, 27.5 mol percent MnO, 5.6 mol percent ferrous oxide (3.5% by weight) remainder ZnO.

The material without aluminium oxide has a temperature coefficient of initial permeability of 0.19% per degree centigrade an initial permeability of 1850, and a Curie point of 219° C.

For an initial composition containing 5 mol percent of aluminium oxide the initial permeability is 1120, the coeffecient of quality is 190,000, the temperature coefficient of permeability is 0.03% per degree C., over the range −40° C. to +80° C., and the Curie point is 199° C.

An aluminium oxide content of 2.5 mol percent reduces the temperature coefficient to one half of its initial value and the aluminium oxide content can be increased to 10 mol percent whilst still keeping this temperature coefficient not exceeding one half of its initial value.

For compositions containing more than 30 mol percent MnO the temperature coefficient is generally high over the full range from −40° C. to +80° C. and cannot be reduced to one half its value over that range by the addition of aluminium oxide. This is illustrated by Fig. 8 which shows curves, similar to those in the other figures, for an initial composition containing 36 mol percent MnO, 54 mol percent of the sum of ferric oxide and aluminium oxide. It will be seen that the replacement of ferric oxide by aluminium oxide has very little effect over the range −40° C. to 0° C. For the range 0° C. to +80° C., however, a considerable effect can be seen to be produced on the temperature coefficient of initial permeability by the replacement of part of the ferric oxide by aluminium oxide, though the results are somewhat anomalous as compared with those obtained with compositions containing less than 30 mol percent MnO. The presence of 3 mol percent aluminium oxide reduces the temperature coefficient and 5 mol percent of aluminium oxide reduces it from +20° C. to +80° C. but worsens it from −40° C. to +20° C. The addition of 6 mol percent aluminium oxide improves the temperature coefficient between 0° C. and +80° C., but the addition of 7 mol percent leads to an increase in that coefficient over the value for 6 mol percent. For the composition containing 6 mol percent aluminium oxide the temperature coefficient of initial permeability is 0.17% per degree C. between 0° C. and +80° C. Whilst the temperature coefficient of the material not containing aluminium oxide is 0.45% per degree centigrade over the same interval. The composition containing 6 mol percent aluminium oxide has a final molecular composition of 44.8 mol percent ferric oxide, 5.9 mol percent aluminium oxide, 4.3 mol percent ferrous oxide (2.7% by weight) 35.2 mol percent MnO and the remainder zinc oxide. The initial permeability is 1350, the coefficient of quality is 205,000 and the Curie point 225° C. For aluminium oxide contents between 5.5 and 10 the temperature coefficient of permeability is better than one half of the value without aluminium oxide.

It may be noted from the U.S. Patent No. 2,886,529 that the magnetic properties of ferromagnetic ceramic materials prepared from mixtures containing an oxide of manganese, ferric oxide and zinc oxide may, for the same molecular content of oxide of manganese, show variations depending upon the iron content. The following example is therefore given for comparison with the results given above in relation to Fig. 7. A starting composition of 47.5 mol percent ferric oxide, 5 mol percent aluminium oxide, 28.3 mol percent manganous oxide and the remainder zinc oxide, gives after heat treatment the same as described above a temperature coefficient of initial permeability of 0.1% per degree centigrade for the range −40° C. to +80° C.; initial permeability 1500, coefficient of quality 170,000.

The final composition is 45.5 mol percent ferric oxide, 4.9 mol percent aluminium oxide, 2.7 mol percent ferrous oxide (1.7% by weight) 27.9 mol percent manganous oxide and the remainder zinc oxide.

The invention has been described above in relation to ferromagnetic ceramic materials (commonly called manganese zinc ferrites) prepared by heating in an atmosphere of nitrogen containing a small amount of oxygen. By this heat treatment and by proportioning correctly the ferric oxide content of the original mixture the highest magnetic properties are obtained.

When an appreciable quantity of aluminium oxide is introduced into the starting composition the material is no longer strictly speaking a ferrite.

It is known that manganese zinc ferrites can be prepared by heat treating a compressed mixture of oxides in air. Although the resulting materials have in general lower initial permeabilities and higher losses than those above referred to they have been used in certain applications, and for these applications it may be important to reduce the temperature coefficient of permeability. By replacing part of the ferric oxide by aluminium oxide in accordance with this invention it is possible to obtain materials having a temperature coefficient of initial permeability less than 0.1% per degree centigrade for the temperature range −40° C. to +80° C. These materials have in general permeabilities less than 500, core equality factor less than 50,000 and in particular rather high hysteresis losses.

In spite of these lower qualities these materials can still be satisfactory in many applications because of the very low temperature coefficient of initial permeability.

Because of the preparation in air the final material may contain an appreciable amount of trivalent manganese ions; this amount may be very variable; and the method referred to above of determining the ferrous oxide content is no longer valid, and only the total content of the different metals present can be safely determined.

As an example of the application of the invention to materials prepared by heating in air the following is given.

For a starting mixture containing 27 mol percent of manganese oxide, 54 mol percent ferric oxide and the remainder zinc oxide, a substitution of 6 mol percent of aluminium oxide for part of the ferric oxide resulted, after pressing and heat treating in air at 1340° C. for 2 hours, in a material having an initial permeability of 750, a coefficient of quality of 41,000 and a temperature coefficient of 0.01% per degree C. for the temperature range −40° C. to +80° C.

Although in the above description, all the examples were prepared from a mixture of oxides, it should be remarked that salts reducible to oxides under the conditions of heat treatment may be used instead of the oxides themselves.

Moreover in U.S. application Serial No. 492,019, filed March 3, 1955, there has been described a method of manufacturing ferrites in which the starting mixture is a mixture of metal powders which are oxidised to the respective oxides and the resulting mixture of oxides is pressed and heat treated to produce a ferrite. The present invention may be practised by replacing part of the iron powder in the initial mixture by a corresponding proportion of aluminium powder. This method applied to the preparation of any of the examples given above (the heat treatment of the pressed mixture of oxides being the same as that given above) gives final materials having substantially the same properties as those detailed above for the respective samples.

What we claim is:

1. A ferromagnetic ceramic material with a temperature coefficient of initial permeability less than that of a manganese-zinc ferrite of the same manganese content, comprising the reaction product produced by the steps of compressing and heat treating at a sintering temperature, in an oxygen containing atmosphere a mixture of oxides consisting of 39 to 55½ mol. percent ferric oxide, 21 to 38 mol. percent manganese oxide, 2½ to 11 mol. percent aluminium oxide and the remainder substantially wholly zinc oxide, the molecular proportion of ferric oxide and aluminium oxide taken together being between 50 and 58 mol. percent.

2. A ferromagnetic ceramic material according to claim 1, wherein calcium oxide is included in the said mixture, preferably in the form of calcium carbonate to the extent of 0.01 to 1% by weight.

3. A ferromagnetic ceramic material with a temperature coefficient of initial permeability of not more than one half of the temperature coefficient of initial permeability over a temperature range of at least 0° C. to 80° C. of a manganese-zinc ferrite containing between 49.7 and 51 mol. percent ferric oxide, between 21 and 38 mol. percent manganese oxide, between 0.1 and 6 mol. percent ferrous oxide, and the remainder substantially wholly zinc oxide comprising the reaction product produced by compressing and heat treating at a sintering temperature in an oxygen containing atmosphere a mixture of oxides containing between 38.7 and 49.5 mol. percent ferric oxide, between 21 and 38 mol. percent manganese oxide, between 0.1 and 6 mol. percent ferrous oxide, between 2½ and 11 mol. percent aluminium oxide and the remainder substantially wholly zinc oxide, the molecular proportion of the ferric oxide and aluminium oxide of the mixture being between 50 and 58 mol. percent.

4. A compressed body of ferromagnetic ceramic material having an initial permeability greater than 500 and a quality coefficient greater than 50,000 composed substantially wholly of from 21 to 38 mol. percent manganous oxide, from 40 to 49.5 mol. percent ferric oxide from 2.5 to 11 mol. percent aluminium oxide, the molecular proportions of the sum of the ferric oxide and aluminium oxide being between 49.7 and 51 mol. percent, from 0.1 to 6 mol. percent ferrous oxide and the remainder zinc oxide, the said material having a temperature coefficient of initial permeability not more than 0.1% per degree centigrade over the temperature range −40° C. to +80° C. for materials containing less than 30 mol. percent of manganous oxide, and not more than 0.2% per degree centigrade over the temperature range from zero ° C. to +80° for materials containing between 30 and 38 mol. percent of manganous oxide.

References Cited in the file of this patent

UNITED STATES PATENTS

| | | |
|---|---|---|
| 2,565,861 | Leverenz et al. | Aug. 28, 1951 |
| 2,576,456 | Harvey et al. | Nov. 27, 1951 |
| 2,579,267 | Leverenz et al. | Dec. 18, 1951 |
| 2,636,860 | Snoek et al. | Apr. 28, 1953 |

FOREIGN PATENTS

| | | |
|---|---|---|
| 1,074,864 | France | Apr. 7, 1954 |
| 1,093,965 | France | Dec. 1, 1954 |

OTHER REFERENCES

Jour. of Chem. Physics, vol. 15 (1947), pp. 174–187.

J. Recherches Centre Nat'l, Chas. Guillaud Recherche Sci. (Labs. Bellevue), pp. 113–122 (1950).

Physical Society of London, Proceedings, vol. 65B, pp. 390–391 (1952).

Gorter: Philips Research Reports, vol. 9, No. 6, pp. 428–437 (December 1954).

Economos: Jour. Amer. Ceramic Soc., pp. 241, 242 (July 1955).